United States Patent [19]
Copple et al.

[11] Patent Number: 6,064,579
[45] Date of Patent: May 16, 2000

[54] SHIFTED DRIVE INVERTER FOR MULTIPLE LOADS

[75] Inventors: Earl James Copple, Arlington Heights; John Michael Rein, Elgin, both of Ill.

[73] Assignee: Northrop Grumman Corporation, Los Angeles, Calif.

[21] Appl. No.: 09/094,790

[22] Filed: Jun. 15, 1998

[51] Int. Cl.$^7$ .................................................. H02M 3/335
[52] U.S. Cl. ................... 363/17; 363/98; 363/132
[58] Field of Search .................. 363/17, 40, 41, 363/43, 95, 97, 98, 131, 132

[56] References Cited

U.S. PATENT DOCUMENTS

| | | | |
|---|---|---|---|
| 3,350,624 | 10/1967 | Annunziato et al. | 321/18 |
| 3,629,686 | 12/1971 | Hetterscheid et al. | 321/18 |
| 3,688,204 | 8/1972 | Hruda | 328/267 |
| 3,708,739 | 1/1973 | Kohler et al. | 321/21 |
| 3,823,362 | 7/1974 | Bailey | 321/27 |
| 4,204,266 | 5/1980 | Kammiller et al. | 363/98 |
| 4,377,779 | 3/1983 | Plunkett | 318/811 |
| 4,608,499 | 8/1986 | Rathmann | 307/66 |
| 4,667,283 | 5/1987 | Seki et al. | 363/95 |
| 4,689,731 | 8/1987 | Walker et al. | 363/24 |
| 4,717,994 | 1/1988 | Diaz et al. | 363/21 |
| 4,994,956 | 2/1991 | Kirchberg, Jr. et al. | 363/95 |
| 5,010,468 | 4/1991 | Nilssen | 363/37 |
| 5,055,762 | 10/1991 | Disser et al. | 318/811 |
| 5,111,376 | 5/1992 | Mehl | 363/71 |
| 5,309,344 | 5/1994 | Smith | 363/20 |
| 5,418,707 | 5/1995 | Shimer et al. | 363/65 |

*Primary Examiner*—Adolf Deneke Berhane
*Attorney, Agent, or Firm*—Terry J. Anderson; Karl J. Hoch, Jr.

[57] ABSTRACT

A square wave power inverter includes a transformer having a primary winding and a secondary winding, first and second input voltage sources, and a pair of power switching transistors connected series between the first and second voltage sources for selectively connecting the first and second input voltage sources to the primary winding of the transformer. A pair of output terminals is connected to the secondary winding of the transformer for receiving a load. An inverter control is connected to the gates of the switching transistors for generating a gate drive signal. The inverter control generates a low impedance, substantially square wave, gate drive signal, producing a substantially square wave inverter output when a substantial load is connected to the output terminals, and a high impedance gate drive signal, producing a trapezoidal inverter output when a light load is connected to the output terminals. In particular, the inverter control is connected to the output terminals, and produces low impedance drive signal when the voltage at the output terminals is below a predetermined threshold, and high impedance drive signals when the voltage at the output terminals is above the predetermined threshold. The inverter control includes a low impedance gate drive that is connected to the gates of the switching transistors when a substantial load is connected to the output terminals, and a higher impedance gate drive that is connected to the gates of the switching transistors when a light load is connected to the output terminals.

10 Claims, 2 Drawing Sheets

GATE TO SOURCE
VOLTAGE OF SWITCH
TRANSISTOR WITH
SOFTENED DRIVE (a)   0 VOLTS → ⎯⎯⎯⎯    ← FET THRESHOLD VOLTAGE (b)

DRAIN TO SOURCE
VOLTAGE OF SWITCH
TRANSISTOR WITH         0 DRAIN TO
SOFTENED DRIVE          SOURCE VOLTAGE

SHIFTED DRIVE INVERTER FOR MULTIPLE LOADS

FIELD OF THE INVENTION

The present invention pertains to power inverters, and specifically to the control of mid-frequency (200 KHz–400 KHz) square wave power inverters.

BACKGROUND OF THE INVENTION

As is understood by those in the industry, power inverters change direct current voltages into alternating current voltages. As is also understood, square wave inverters are more efficient than pulse width modulated inverters. However, in mid-frequency power inverters, the switching losses associated with the power transistors can become a dominant loss mechanism. Both "ON" and "OFF" switching transitions can be minimal when the effects of the parasitic circuit elements are used in an optimum manner.

In a square wave power inverter, a low impedance gate drive having switching edges on the order of 20 nanoseconds (nS) or less, is used to minimize switching losses when a heavy load is applied to the inverter. However, under no load or very light load conditions, the high speed at which the inverter switches causes ringing of the parasitic elements of the output power transformer. This ringing causes the output voltage to overshoot and peak charge the output capacitors, resulting in output voltages that may approach double the nominal value.

Therefore, an object of the invention is to provide a power inverter that can be run at full duty cycle over a widely varying load range.

Another object of the invention is to provide an efficient power inverter that can be used over a widely varying load range.

Another object of the invention is to permit a square wave power inverter to be employed in circuits where the output is not tightly regulated but must remain within a given range.

Another object of the invention is to reduce the tendency of a square wave inverter to "peak charge" and exceed its nominal output voltage when a light load is applied to the inverter output.

Another object of the invention is to slow the inverter output voltage transition when a light load is applied to the inverter output.

Another object of the invention is to provide a square wave power inverter that employs trapezoidal operation when a light load is connected to the output.

Another object of the invention is to provide a mechanism for controlling gate drive impedance into the switching transistors of a square wave power inverter.

SUMMARY OF THE INVENTION

The present invention is a square wave power inverter with improved inverter control. The improved inverter control increases the impedance in the gate drive of the switching transistors to slow the switching rate when the inverter detects that no load or a light load is attached at the voltage output terminals.

A square wave power inverter includes a transformer having a primary winding and a secondary winding, first and second input voltage sources, and a pair of power switching transistors connected in series between the first and second voltage sources for selectively connecting the first and second input voltage sources to the primary winding of the transformer. A pair of output terminals is connected to the secondary winding of the transformer for receiving a load. An inverter control is connected to the gates of the switching transistors for generating a gate drive signal. The inverter control generates a substantially square wave gate drive signal having minimal dead time when a substantial load is connected to the output terminals. When a light load is connected to the output terminals, the shape of the gate drive signals is controlled by the drain to gate capacitance of the power transistors and the impedance of the gate drive circuitry. During the switching transition, the gate of the transistor is held at its threshold voltage as a result of drain to gate capacitance working against the gate drive circuitry output impedance. In particular, the inverter control is connected to the output terminals, and generates a low impedance substantially square wave drive signal resulting in a square wave inverter output when the voltage is below a predetermined level. Under very light or no load conditions when the output voltage exceeds the predetermined level, the gate drive impedance is increased, thus generating a gate drive signal that causes a trapezoidal inverter output.

BRIEF DESCRIPTION OF THE DRAWINGS

FIG. 3(a) is a timing diagram showing the gate to source voltage of a switch transistor in one mode of operation of a device incorporating the invention.

FIG. 3 (b) is a timing diagram showing the drain to source voltage of a switch transistor in the same mode of operation of the device incorporating the invention.

DETAILED DESCRIPTION OF THE PREFERRED EMBODIMENT

Figure 1:
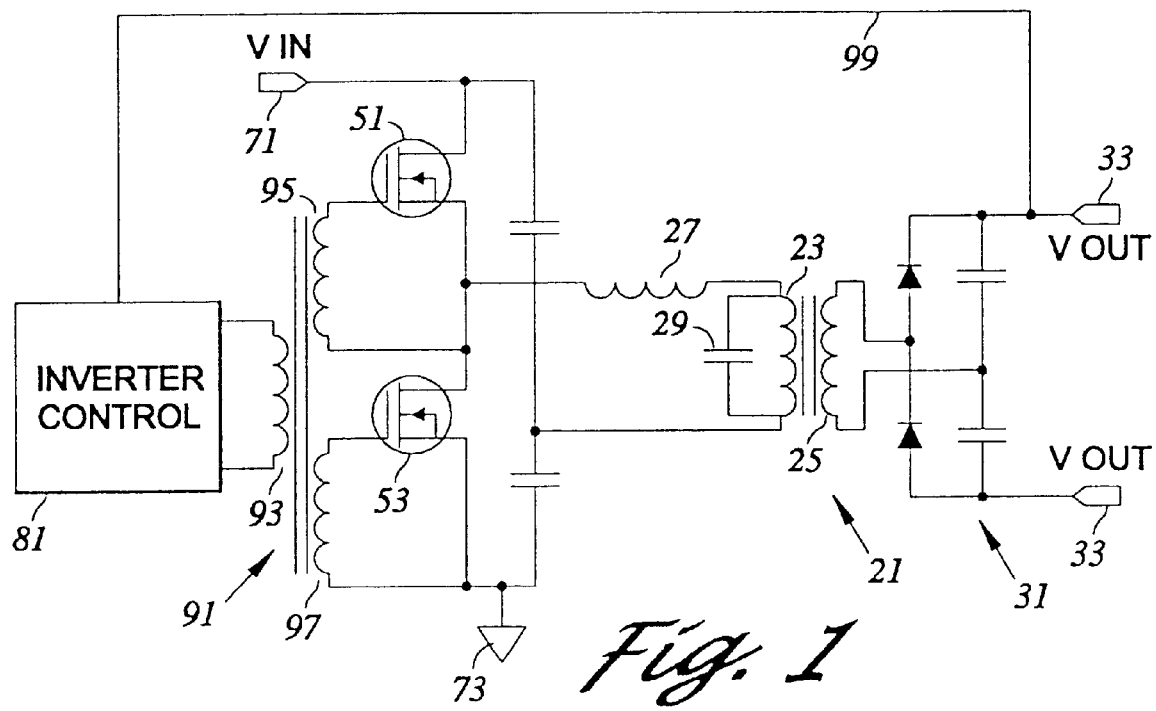
FIG. 1 is a schematic diagram of a power inverter incorporating the present invention.

An inverter incorporating the present invention is illustrated in FIG. 1. The inverter includes a transformer 21 and a pair of switching transistors 51, 53 controlling the application of input voltages 71, 73 to the primary winding of the transformer 21.

The transformer has a primary winding 23 and a secondary winding 25. Output circuitry 31 is connected across the secondary winding 25. The output circuitry may comprise diodes and capacitors. The output voltage $V_{out}$ appears across the output terminals 33.

Transformers have leakage inductance. The leakage inductance of the transformer 21 is shown in FIG. 1 as an inductor 27 having inductance $L_1$ connected in series with the winding 23. The reflected parasitic capacitance from the secondary winding and its associated output circuitry is shown as a capacitor 29 parallel to the primary winding of the transformer. The parasitic capacitor 29 has capacitance $C_p$.

A pair of power switching transistors (FET's) 51, 53 control the voltage applied to the primary winding 23 of the transformer. The switching transistors may be APT5085 FET's. The switching transistors 51, 53 are connected in series between a high input voltage 71 ($V_{in}$) and a low input voltage 73, such as ground potential. The switching transistors selectively connect the voltage sources $V_{in}$ and ground to the primary winding of the transformer. In an exemplary application, $V_{in}$ is provided by a boost supply. The boost supply may be part of the control loop, and typically is 340–360 volts.

An inverter control 81 controls the switching transistors 51, 53. To control the switching transistors, the inverter control 81 is connected to the gates of the switching transistors. The inverter control may generate a square wave gate drive signal.

The inverter control 81 causes the switching transistors 51, 53 to reverse the voltage across the primary 23 of the transformer each half cycle. Each time the voltage across the primary is reversed, a current surge flows through the leakage inductance 27 $L_1$ of the transformer. That current surge through the inductance 27 resonates with the composite capacitance 29 $C_p$ reflected from the secondary 25 and associated circuitry. That resonance causes voltage ringing on the secondary winding of the transformer. The ringing may cause the peak to peak output voltage at the output terminals 33 to be double the nominal output voltage value.

The current surge is directly related to the voltage slew rate implied across the primary of the transformer. The rate of voltage transition across the primary of the transformer in turn is dictated by the switching rate of the switching transistors 51, 53. In a conventional square wave inverter that does not incorporate the present invention, a low impedance drive signal having a fast transition, is applied to the gates of the switching transistors. Such a low impedance drive signal minimizes the switching time for the switching transistors, and minimize power losses in the inverter. The gate drive signal is generated by the inverter control 81.

Figure 2A:
FIGS. 2(a) and (b) are a timing diagram showing the switching voltage of the circuit in two different operating modes.
Figure 2B:

A low impedance drive signal may be on the order of 10 ohms. Such a low impedance drive signal may then provide a peak gate drive current of approximately one amp (1 A) to the gates of the switching transistors. The result may be a 15 volt slew in the voltage applied to the gates of the switching transistors in approximately 100 nanoseconds (nS). This sharp transition will cause the output voltage at the output terminals to transition in approximately 50 nanoseconds (nS). This may be called a "hard" gate drive, which produces a sharp output voltage transition. FIG. 2(*a*) shows the square wave output signal produced by the inverter.

When a load is attached to the output voltage terminals 33, the output voltage reverses as desired. However, as noted above, when the load is removed from the output terminals, or when a light load is attached to the output terminals, peak charging will begin to occur, and the output voltage at the output terminals will begin to rise above the nominal voltage.

The inverter of the described embodiment slows the voltage transition at the output terminals when there is a light load, or no load connected to the output terminals. For example, the voltage transition time at the output terminals 33 may be increased from 50 nS described above to 850 nS.

When a light load is connected to the output terminals 33, the inverter of the present invention slows the switching speed of the switching transistors 51, 53 that control the connection of the input voltages to the primary winding 23 of the transformer. So slowing the switching speed reduces the current surge in the primary of the transformer.

The switching speed of the switching transistors may be slowed by "softening" the gate drive signal applied to the gates of the switching transistors. The gate drive signal is softened by increasing its impedance. FIG. 2(*b*) shows an inverter output with "softened" gate drive signals longer transition times applied to the transistors 51, 53. As is seen in FIG. 2(*b*), the inverter output with "softened" gate drive is trapezoidal, rather than square.

With the slower voltage slew, the current surge into the leakage inductance 27 is minimized. So reducing the current surge into the leakage inductance minimizes the voltage ringing across the secondary 25. By reducing the voltage ringing across the secondary, peak charging is reduced, and the output voltage at the output terminals 33 will tend to stay within nominal values.

Referring to FIG. 3, a sketch of the gate waveform with the "softened" gate drive is shown. In FIG. 3(*a*), the gate to source voltage of the switch is shown. At the initiation of a gate drive edge, nothing happens until the gate to source voltage threshold is reached (shown at time T1 in FIG. 3(*a*). At that point, the drain to source voltage of the switch transistor begins to fall, as shown in FIG. 3(*b*). This discharges the drain to gate capacitance through the gate drive circuitry. This discharge causes the gate voltage to remain at the FET gate threshold until the drain to source voltage has reached 0 volts, at which time the gate continues to rise to the drive circuit voltage. The "softened" drive is thus obtained by increasing the drive impedance to allow the falling drain voltage to control the gate.

The precise value of the increased gate drive impedance in the inverter control 81 will vary depending on the application. The value of the increased gate drive impedance depends primarily on the size of the die being driven, and on the desired switching slew rate.

For example, with the exemplary APT5085 FET's, the inverter control 81 may include a 300 ohm resistance (not shown) in the ground leg to provide the increased gate drive impedance for the "softened" drive. For the "hard" drive, the 300 ohm resistance in the ground leg of the inverter control 81 may be shorted, so that the output impedance is reduced to the ON resistance of the drive circuitry.

Thus, when a substantial load is detected at the inverter output voltage terminals 33, the inverter control 81 selects a low impedance gate drive to produce a square wave control signal for the gates of, and a square wave output from, the switching transistors 51, 53. However, when a light load is detected at the inverter voltage output terminals 33, the inverter control 81 increases the output impedance of the gate drive circuitry. The increased impedance causes the drain to gate capacitance of the transistors 51, 53 to hold the gates at the threshold during the output transition, thus producing a trapezoidal inverter output. The inverter control 81 selects a higher impedance gate drive, or increases the gate drive impedance, to produce a trapezoidal control signal for the gates of the switching transistors 51, 53.

The inverter control 81 is isolated from the remainder of the inverter by a transformer 91. The inverter control drives a primary winding 93. One secondary winding 95 is connected to the gate of the first switching transistor 51. Another secondary winding 97 is connected to the gate of the second switching transistor 53.

The inverter control incorporated in the present invention detects when no or little load is attached to the voltage output terminals 33. This detection may be accomplished by a feedback connection 99 between the inverter control 81 and the output voltage terminals 33. For example, the feedback 99 may include monitoring of the output voltage at the output terminals 33. If the voltage exceeds a predetermined threshold, the inverter control determines that the load has been removed, and increases the impedance of the gate drive signal to create a soft drive to the switching transistors, and thus slow the output voltage transition. The threshold may be slightly higher than the nominal output voltage.

The inverter described above is particularly useful in power converters such as those used for Traveling Wave Tubes (TWT's). In a TWT, the load is either 0 watts, when the TWT is gated off, or varies between about 30% and 100% when the TWT is on. A zero voltage switching full duty cycle inverter can be used to generate an unregulated high voltage stack with taps for TWT collector voltages. A linear regulator can then be used to maintain the TWT cathode voltage. Under the no load or a light load condition, the inverter edges are slowed to limit the high voltage output and voltage across the pass element. The linear regulator processes a very small portion of the total load dealing only with the TWT Helix Current. The added losses from the pass element are insignificant in comparison with the added inverter losses of a conventional Pulse Width Modulated (PWM) inverter.

A specific embodiment of the invention has been described. Those skilled in the art will recognize that certain modifications can be made to the specifics without departing from the spirit of the invention. Therefore, the above description should be considered exemplary only, and not limiting.

What is claimed is:

1. A square wave power inverter comprising:
   a) a transformer having a primary winding and a secondary winding;
   b) first and second input voltage sources;
   c) a pair of power switching transistors connected between the first and second voltage sources for selectively connecting the first and second input voltage sources to the primary winding of the transformer;
   d) a pair of output terminals connected to the secondary winding of the transformer; and
   e) an inverter control connected to the gates of the switching transistors for generating a gate drive signal, wherein the inverter control is configured to generate a low impedance gate drive signal to the gates of the switching transistors when a substantial load is connected to the output terminals, and the inverter control is configured to generate a higher impedance gate drive signal to the gates of the switching transistors when a light load is connected to the output terminals in order to reduce voltage surges across the primary and secondary winding of the transformer.

2. The square wave power inverter of claim 1 wherein the low impedance gate drive signal is a substantially square shaped waveform and the higher impedance gate drive signal is a substantially trapezoidal shaped waveform.

3. The square wave power inverter of claim 1 wherein a slew rate of the low impedance gate drive signal is higher than a slew rate of the higher impedance gate drive signal.

4. A square wave power inverter comprising:
   a transformer having a primary winding and a secondary winding;
   a first input voltage source and a second input voltage source;
   a first power switching transistor electrically connected to the first input voltage source;
   a second power switching transistor electrically connected to the second input voltage source and the first power switching transistor;
   the first and second power switching transistors being operative to selectively connect the first and second input voltage sources to the primary winding of the transformer;
   a first output terminal electrically connected to the secondary winding of the transformer;
   a second output terminal electrically connected to the secondary winding of the transformer, the first and second output terminals being operative to connect an electrical load therebetween; and
   an inverter control connected to the first and second power switching transistors and the first output terminal, the inverter control configured to generate a substantially square wave inverter output to the first and second power switching transistors when a substantial load is detected at the first output terminal and generate a substantially trapezoidal inverter output to the first and second power switching transistors when a light load is detected at the first output terminal in order to reduce voltage surges across the primary and secondary windings of the transformer.

5. The square wave power inverter of claim 4, wherein the inverter control generates a substantially square wave output to the first and second switching transistors when the voltage detected at the first output terminals drops below a predetermined threshold, and the inverter control generates a trapezoidal output to the first and second switching transistors when the voltage detected at the first output terminal exceeds the predetermined threshold.

6. The square wave power inverter of claim 4, wherein the inverter control generates a low impedance square wave output and a high impedance trapezoidal output.

7. The square wave power inverter of claim 4 wherein the inverter control is configured to generate the trapezoidal inverter output when no load is detected at the output terminals.

8. A method of controlling a square wave power inverter, wherein the power inverter comprises a transformer having a primary winding and a secondary winding, an output connected to the secondary winding, a pair of switching transistors for selectively connecting a high input voltage and a low input voltage to the transformer primary winding, and an inverter control connected to the switching transistors and the output, the method comprising the steps of:
   a) detecting an electrical load at the output with the inverter control;
   b) switching the transistors rapidly with the inverter control when a substantial load is detected; and
   c) switching the transistors slowly with the inverter control when a light load is detected in order to prevent voltage surges across the primary and secondary windings of the transformer.

9. The method of claim 8 wherein step (b) comprises switching the transistors with a substantially square waveform and step (c) comprises switching the transistors with a substantially trapezoidal shaped waveform.

10. The method of claim 8, wherein step (b) comprises driving the switching transistors with a low impedance gate drive signal, and step (c) comprises increasing the impedance of the gate drive signal with the inverter control.

* * * * *